US012424905B2

(12) United States Patent
Arita et al.

(10) Patent No.: US 12,424,905 B2
(45) Date of Patent: Sep. 23, 2025

(54) STATOR AND DYNAMO-ELECTRIC MACHINE

(71) Applicant: Mitsubishi Electric Corporation, Tokyo (JP)

(72) Inventors: Hideaki Arita, Tokyo (JP); Yuki Hidaka, Tokyo (JP); Kenji Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 272 days.

(21) Appl. No.: 17/790,130

(22) PCT Filed: Apr. 1, 2020

(86) PCT No.: PCT/JP2020/015021
§ 371 (c)(1),
(2) Date: Jun. 30, 2022

(87) PCT Pub. No.: WO2021/199376
PCT Pub. Date: Oct. 7, 2021

(65) Prior Publication Data
US 2023/0044024 A1    Feb. 9, 2023

(51) Int. Cl.
*H02K 9/19*   (2006.01)
*H02K 1/32*   (2006.01)
*H02K 3/24*   (2006.01)

(52) U.S. Cl.
CPC ............. *H02K 9/19* (2013.01); *H02K 1/32* (2013.01); *H02K 3/24* (2013.01)

(58) Field of Classification Search
USPC .................................................. 310/58–59
See application file for complete search history.

(56) References Cited

U.S. PATENT DOCUMENTS

| 8,482,167 | B2 * | 7/2013 | Erfanfar | B60K 6/40 |
| | | | | 310/58 |
| 2005/0012409 | A1 * | 1/2005 | Philippart | H02K 3/24 |
| | | | | 310/52 |

(Continued)

FOREIGN PATENT DOCUMENTS

| JP | 2005-51997 A | 2/2005 |
| JP | 2006-81379 A | 3/2006 |

(Continued)

OTHER PUBLICATIONS

International Search Report and Written Opinion mailed on Jun. 16, 2020, received for PCT Application PCT/JP2020/015021, filed on Apr. 1, 2020, 9 pages including English Translation.

(Continued)

*Primary Examiner* — Oluseye Iwarere
*Assistant Examiner* — Minki Chang
(74) *Attorney, Agent, or Firm* — XSENSUS LLP (57) ABSTRACT

A stator includes: a stator core including an annular yoke portion and a plurality of tooth portions formed on an inner side in a radial direction of the yoke portion so as to be arranged at predetermined intervals in a circumferential direction and protrude toward the inner side in the radial direction; and a winding arranged in slots formed between the tooth portions. The stator includes cooling tubes made of a nonconductive material, extending in an axial direction of the stator, and serving as flow paths for a coolant. The cooling tube has a constant outer shape along the axial direction and has a thickness that changes along the axial direction.

6 Claims, 10 Drawing Sheets

(56) References Cited

U.S. PATENT DOCUMENTS

| | | | |
|---|---|---|---|
| 2005/0151429 A1 | 7/2005 | Taketsuna et al. | |
| 2011/0109095 A1 | 5/2011 | Stiesdal | |
| 2011/0133580 A1* | 6/2011 | Sugimoto | H02K 1/20 |
| | | | 310/54 |
| 2013/0076171 A1* | 3/2013 | Lepres | H02K 15/02 |
| | | | 310/59 |
| 2020/0227965 A1* | 7/2020 | Huber | B60L 3/0061 |

FOREIGN PATENT DOCUMENTS

| | | |
|---|---|---|
| JP | 2006-218350 A | 8/2006 |
| JP | 2008-49026 A | 3/2008 |
| JP | 2011-99442 A | 5/2011 |
| JP | 2011-120402 A | 6/2011 |
| WO | 2004/019468 A1 | 3/2004 |

OTHER PUBLICATIONS

Office Action issued Feb. 24, 2025 in corresponding Chinese Patent Application No. 202080098709.3.
Second Office Action, dated Jul. 7, 2025, in corresponding Chinese Patent Application No. CN202080098709.3.

* cited by examiner

STATOR AND DYNAMO-ELECTRIC MACHINE

CROSS-REFERENCE TO RELATED APPLICATION

The present application is based on PCT filing PCT/JP2020/015021, filed Apr. 1, 2020, the entire contents of which are incorporated herein by reference.

TECHNICAL FIELD

The present disclosure relates to a stator and a rotary electric machine.

BACKGROUND ART

In conventional rotary electric machines, as a cooling part for a stator of an automobile rotary electric machine, for example, an oil-cooling type which directly sprays a coolant to a coil and an iron core which are heat-generating parts and a type in which a coolant flows in a frame or a motor, are known. In addition, a type in which a coolant flows in slots to perform cooling is disclosed (see, for example, Patent Document 1).

CITATION LIST

Patent Document

Patent Document 1: Japanese Laid-Open Patent Publication No. 2011-120402

SUMMARY OF THE INVENTION

Problems to be Solved by the Invention

In conventional rotary electric machines, in a case of considering a coil which will become a severe state mainly in thermal sense, since heat-generating parts due to copper loss differ depending on differences among resistance values of parts of coils, or in accordance with heat dissipation paths for cooling by a coolant in a water-cooling frame and slots, a heat gradient arises three-dimensionally. Thus, in a conventional cooling part, since the sectional shape is constant along the axial direction, high-temperature parts and low-temperature parts arise three-dimensionally. If there is locally a part where the temperature is high, in terms of component protection, there is a problem that temperature-protection control needs to be performed at a temperature when the locally-high-temperature part reaches an upper-limit temperature.

The present disclosure has been made to solve the above problem, and an object of the present disclosure is to provide a stator and a rotary electric machine that can reduce the temperature of a part where the temperature is locally increased.

Solution to the Problems

A stator according to the present disclosure includes: a stator core including a yoke portion formed in an annular shape and a plurality of tooth portions formed on an inner side in a radial direction of the yoke portion so as to be arranged at predetermined intervals in a circumferential direction and protrude toward the inner side in the radial direction; and a winding arranged in slots formed between the tooth portions. The stator includes cooling tubes made of a nonconductive material, each cooling tube extending in an axial direction of the stator and serving as a flow path for a coolant. The cooling tube has a constant outer shape along the axial direction and has a thickness that changes along the axial direction.

A rotary electric machine according to the present disclosure includes: the above stator; and a rotor provided so as to be opposed to the stator with a gap therebetween.

Effect of the Invention

The stator and the rotary electric machine according to the present disclosure can reduce the temperature of a part where the temperature is locally increased.

DESCRIPTION OF EMBODIMENTS

In the description of each embodiment shown below, directions of a rotary electric machine 1 are represented as a circumferential direction Z, an axial direction Y, a one-end side Y1 in the axial direction Y, an other-end side Y2 in the axial direction Y, a radial direction X, an outer side X1 in the radial direction X, and an inner side X2 in the radial direction X. Therefore, also for the stator 2 and the rotor 3, these directions are applied in the same manner, and each part thereof is described with its directions shown with reference to the above directions.

Embodiment 1

Figure 1:
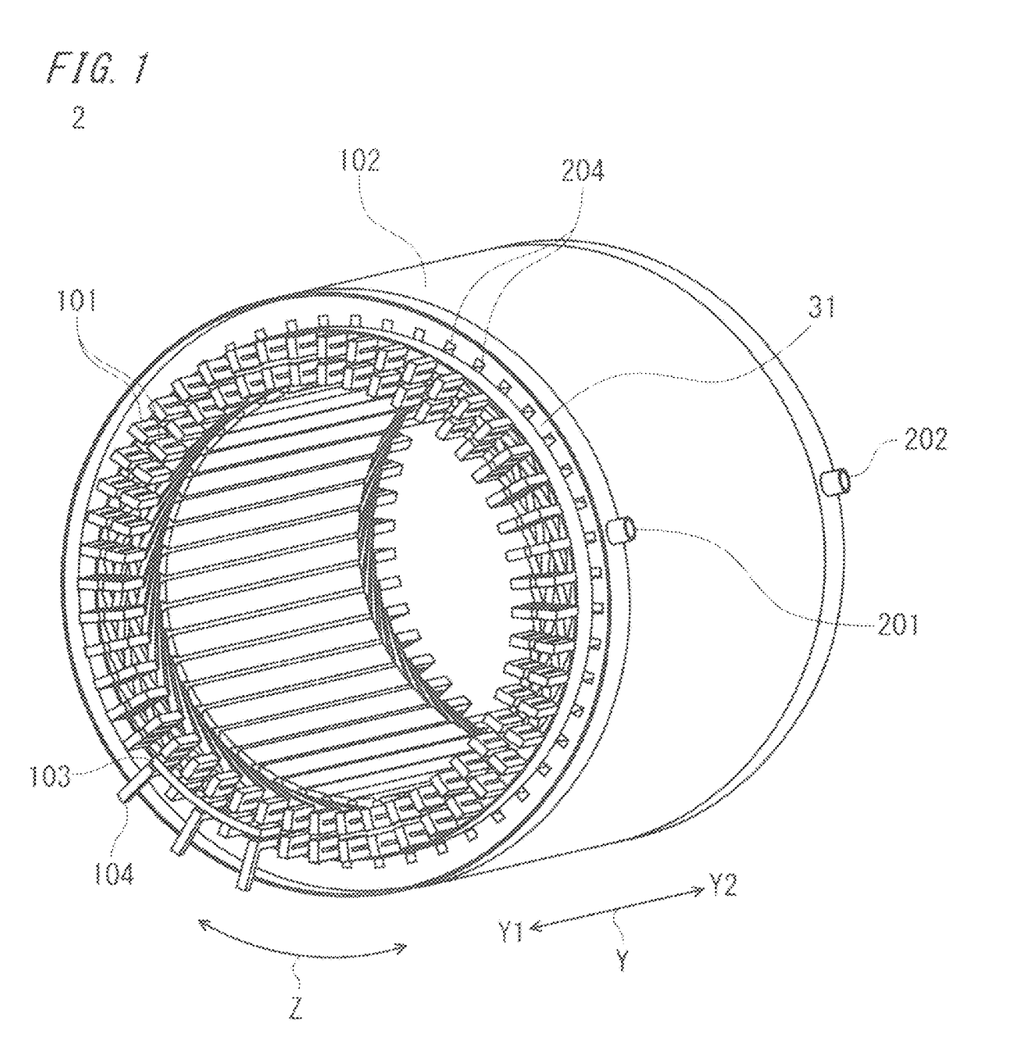
FIG. 1 is a perspective view showing the outer appearance of the structure of a stator of a rotary electric machine according to embodiment 1.
Figure 2:
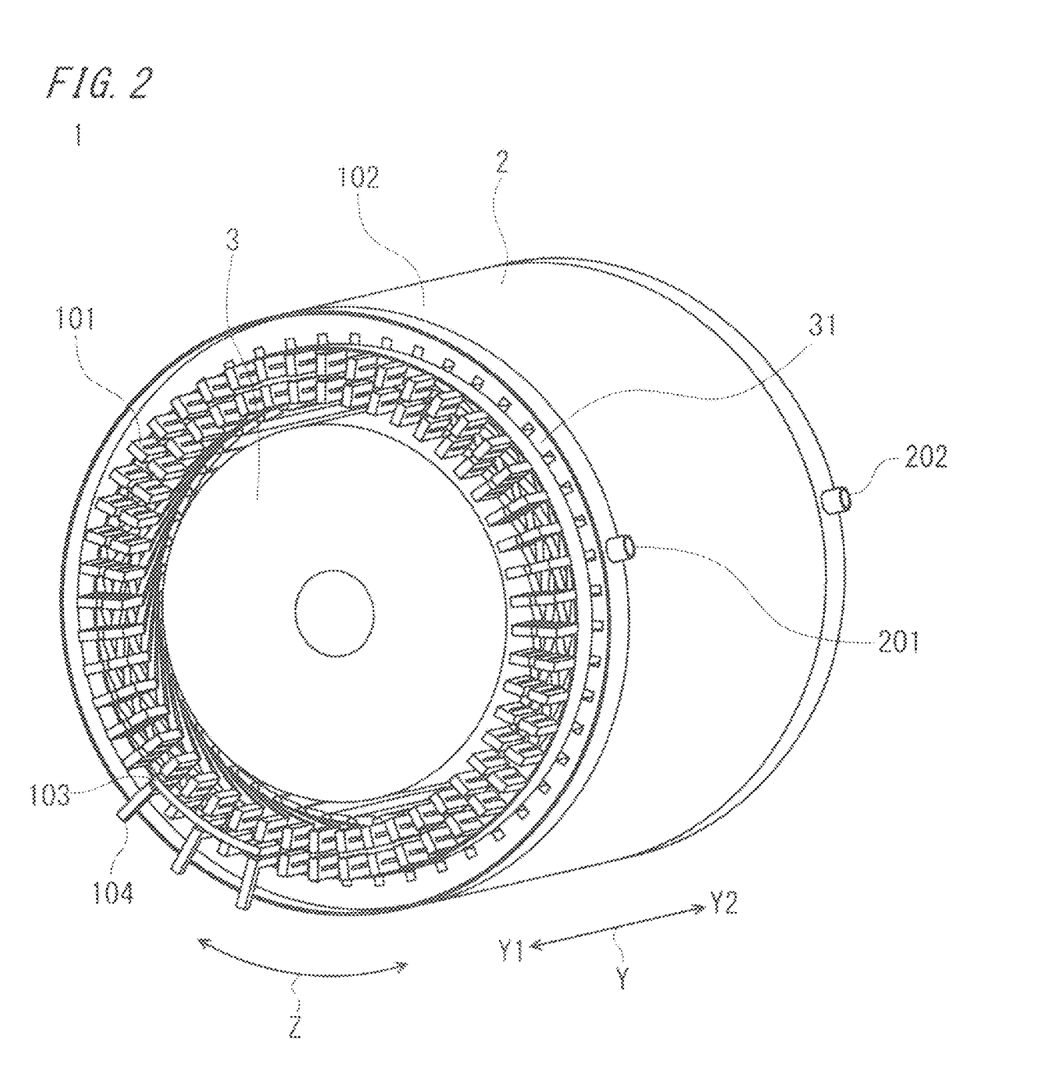
FIG. 2 is a perspective view showing the outer appearance of the structure of a rotary electric machine having the stator shown in FIG. 1.
Figure 3:
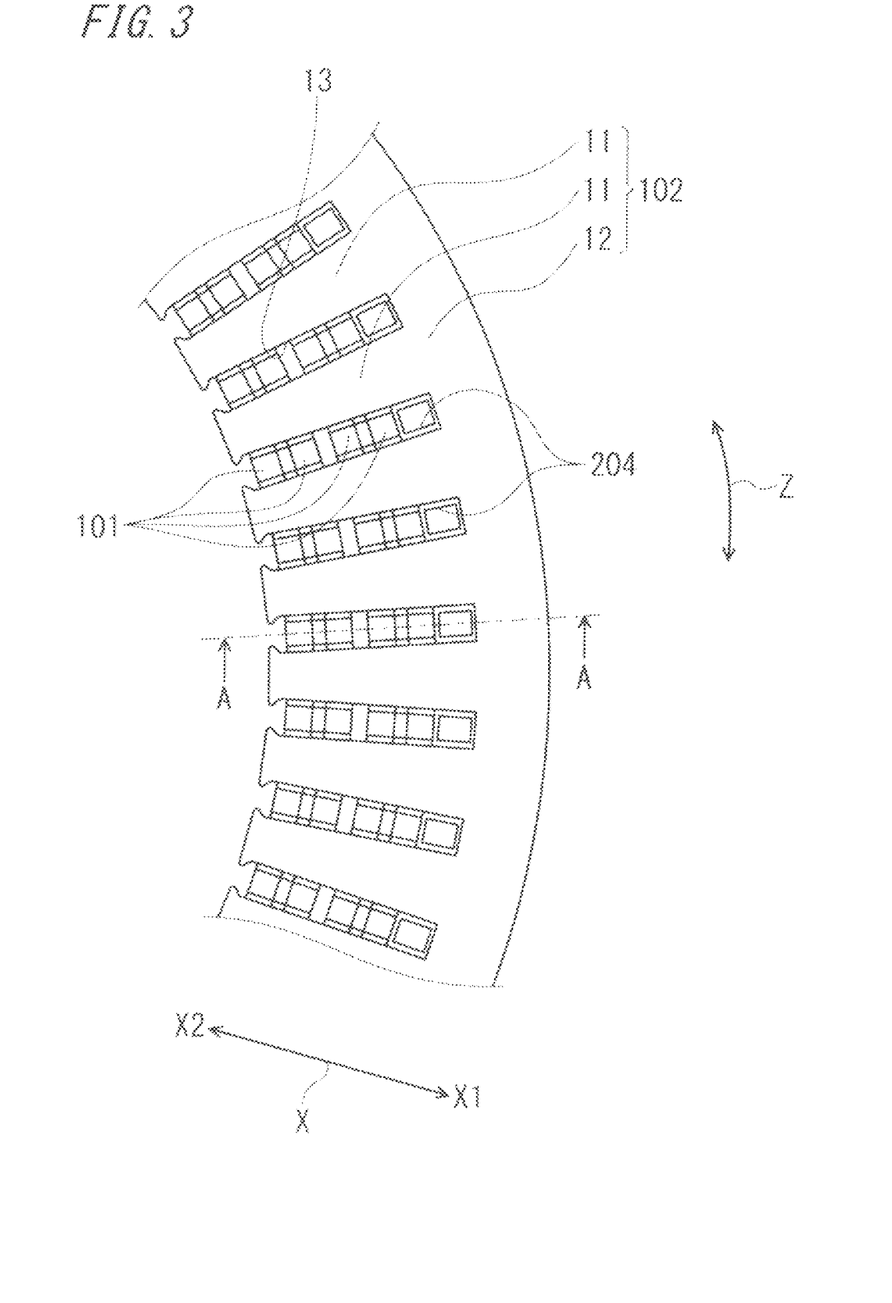
FIG. 3 is a sectional view along the radial direction, showing the structure of the stator shown in FIG. 1.
Figure 4:
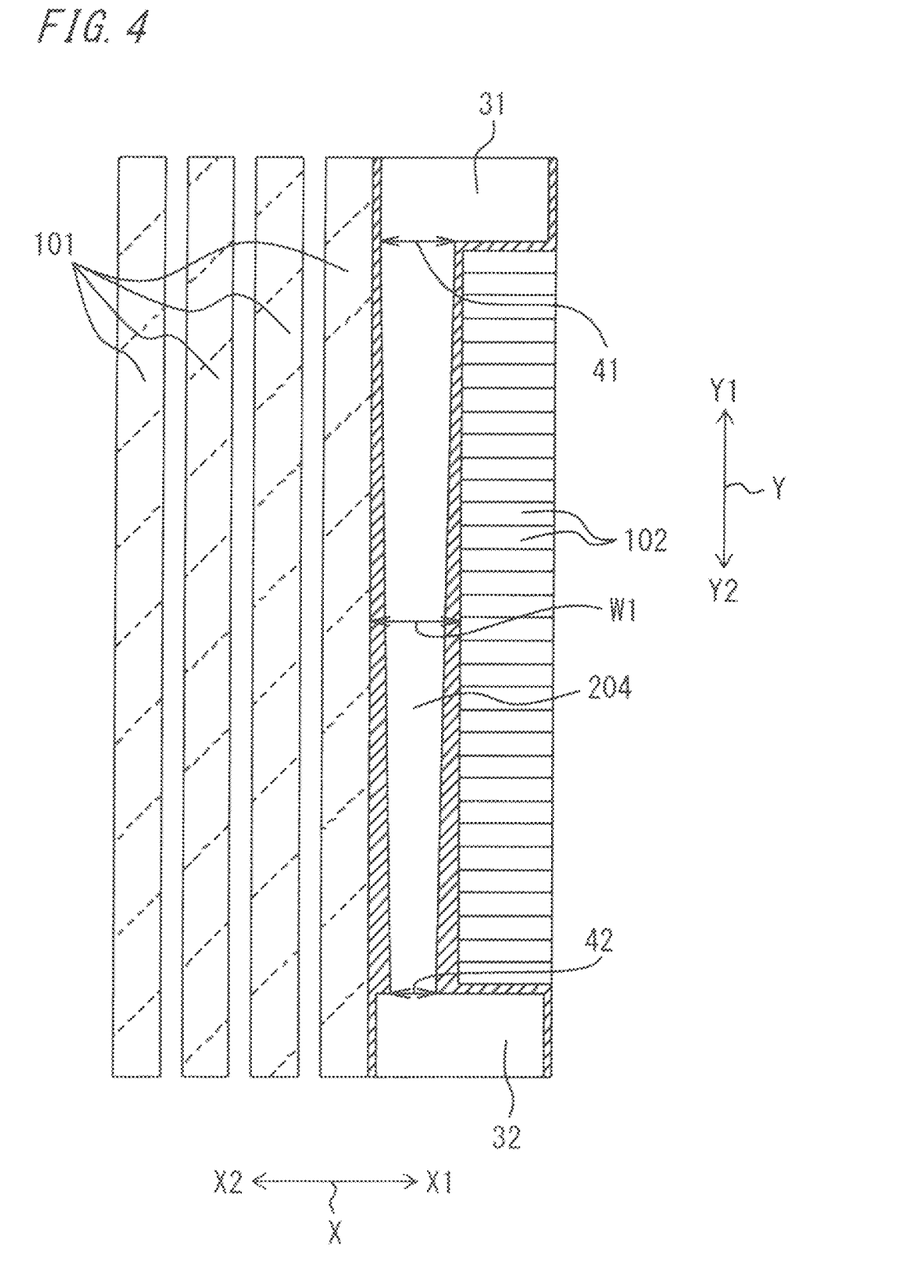
FIG. 4 is a sectional view showing the structure in an A-A cross-section of the stator shown in FIG. 3.
Figure 5:
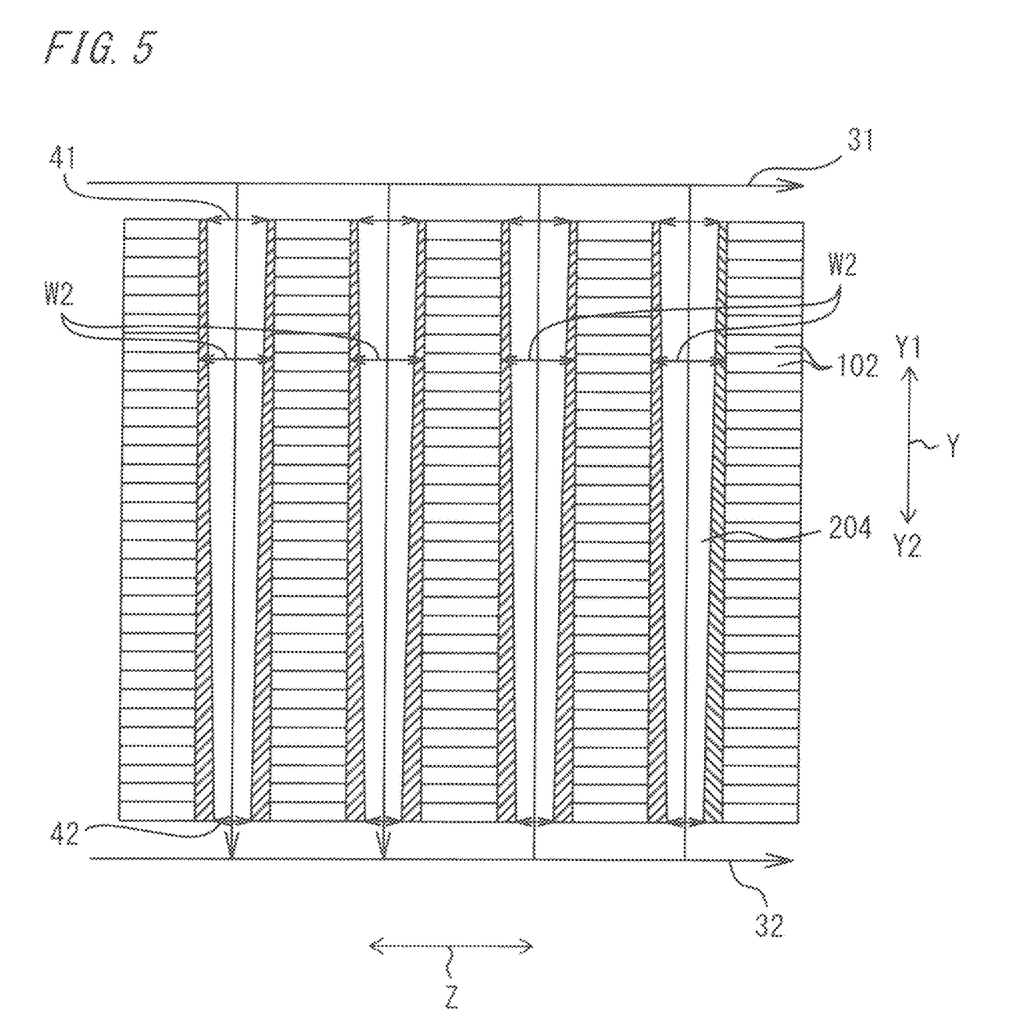
FIG. 5 is a schematic sectional view along the axial direction, showing the structure of the stator shown in FIG. 1, when a circumferential-direction part is seen from the inner-circumferential side.

FIG. 1 is a perspective view showing the outer appearance of the structure of a stator of a rotary electric machine according to embodiment 1. FIG. 2 is a perspective view showing the outer appearance of the structure of the rotary electric machine having the stator shown in FIG. 1. FIG. 3 is a sectional view along the radial direction, showing the structure of the stator shown in FIG. 1. FIG. 4 is a sectional view showing the structure in an A-A cross-section of the stator shown in FIG. 3. FIG. 5 is a schematic sectional view along the axial direction, showing the structure of the stator shown in FIG. 1, when the circumferential-direction part is seen from the inner side toward the outer side in the radial direction (hereinafter, simply referred to as "from inner-circumferential side").

In the drawings, regarding the shapes of a first coolant chamber 31 and a second coolant chamber 32 described later, their respective ends in the axial direction Y are actually closed, but for convenience of description, the respective ends in the axial direction Y are shown in a state of not being closed. In FIG. 5, although the circumferential direction Z is along a curved surface, the structure is schematically shown in a straight shape for convenience of description. Such matters are applied in the same manner also to the other embodiments, and description thereof is omitted as appropriate.

In FIG. 2, the rotary electric machine 1 includes a stator 2 and a rotor 3. In FIG. 1, the stator 2 includes a stator core (hereinafter, simply referred to as "core") 102, a winding 101, and cooling tubes 204. In FIG. 3, the core 102 includes a yoke portion 12 and a plurality of tooth portions 11. The core 102 is formed by stacking a plurality of electromagnetic-steel sheets in the axial direction Y, for example. The yoke portion 12 is formed in an annular shape. The tooth portions 11 are formed on the inner side X2 in the radial direction X of the yoke portion 12 so as to be arranged at predetermined intervals in the circumferential direction Z and protrude toward the inner side X2 in the radial direction X.

The winding 101 is arranged in slots 13 formed between the tooth portions 11. In FIG. 1 in embodiment 1, the numbers of the tooth portions 11 and the slots 13 are each 48, but these numbers are not limited thereto. In embodiment 1, the winding 101 is arranged such that four wires, i.e., four turns are placed in each slot 13. The winding 101 in embodiment 1 is not a concentrated-winding type in which each winding is wound around one tooth portion 11, but is a distributed-winding type in which the winding is formed with a certain cycle.

The winding type may be either type, and the effects of embodiment 1 do not change. The same effects are provided even in a case of using another winding type, e.g., the concentrated-winding type. The same applies to the other embodiments and description thereof is omitted as appropriate. The pitch in the circumferential direction Z of the winding 101 is determined by the number of poles. The rotary electric machine 1 of embodiment 1 is assumed to have eight poles, for example, and therefore the winding 101 for the same phase is formed at a pitch of 45° corresponding to one pole.

In FIG. 4 and FIG. 5, the cooling tube 204 extends in the axial direction Y and is made of a nonconductive material such as resin which serves as a flow path for a coolant. The cooling tube 204 has a constant outer shape along the axial direction Y, that is, an outer width W1 in the radial direction X and an outer width W2 in the circumferential direction Z are each constant along the axial 30 direction Y, while the thickness changes along the axial direction Y. In embodiment 1, the thickness of the cooling tube 204 increases from the one-end side Y1 toward the other-end side Y2 in the axial direction Y. Since the outer widths W1, W2 in the radial direction X and the circumferential direction Z are both constant along the axial direction Y of the cooling tube 204, a large-width portion 41 in which the flow path for the coolant is widened is formed on the one-end side Y1 in the axial direction Y and a narrow-width portion 42 in which the flow path for the coolant is narrowed is formed on the other-end side Y2 in the axial direction Y.

On the axial-direction side where the thickness of the cooling tube 204 is small, here, on the one-end side Y1 in the axial direction Y, a wire-connection portion 103 and a terminal portion 104 of the winding 101 are formed. Here, three-phase Y-connection is assumed as an example, and the wire-connection portion 103 corresponding to the neutral point and the terminal portion 104 for supplying power to the rotary electric machine 1 are shown. An introduction port 201 (described later) for the coolant is formed on the axial-direction side where the thickness of the cooling tube 204 is small, here, on the one-end side Y1 in the axial direction Y. The smaller the thickness of the resin which is a nonconductive material forming the cooling tube 204 is, the greater the cooling effect is. However, for ensuring the insulation distance and preventing resin crack or the like in molding, the minimum thickness is determined by viscosity of the resin material and the like. For the side where the thickness of the resin is great, a parameter is determined by a molding condition such as the draft of a mold in molding. The same applies to the other embodiments and therefore description thereof is omitted as appropriate.

The cooling tube 204 is provided on the outer side X1 in the radial direction X relative to the winding 101 in the slot 13. In the slot 13, the winding 101 and the cooling tube 204 are arranged in a straight shape in the radial direction X. That is, the cooling tube 204 is adjacent also to the yoke portion 12.

On the one-end side Y1 and the other-end side Y2 in the axial direction Y of the plurality of cooling tunes 204, the first coolant chamber 32 and the second coolant chamber 32 are respectively formed so as to communicate with the plurality of cooling tubes 204 along the circumferential direction Z and serve as flow paths for the coolant. The first coolant chamber 31 and the second coolant chamber 32 are formed so as to communicate over the entire circumferences in the circumferential direction Z on the one-end side Y1 and the other-end side Y2 in the axial direction Y of the plurality of cooling tubes 204.

As shown in FIG. 1, the introduction port 201 for introducing the coolant from outside is formed at the first coolant chamber 31, i.e., on the one-end side Y1 in the axial direction Y. A discharge port 202 for discharging the coolant to outside is formed at the second coolant chamber 32, i.e., on the other-end side Y2 in the axial direction Y.

Next, how the coolant flows in the rotary electric machine 1 having the stator 2 of embodiment 1 configured as described above will be described. First, the coolant supplied from a cooling device composed of a pump and a heat exchanger at outside (not shown) is introduced through the introduction port 201 into the first coolant chamber 31. Then, the coolant flows in the first coolant chamber 31 over the entire circumference in the circumferential direction Z of the rotary electric machine a on the one-end side 71 in the axial direction Y of the core 102, and is introduced into the cooling tubes 204 provided in the respective slots 13.

Then, the coolant flows from the one-end side Y1 to the other-end side Y2 in the axial direction Y of each cooling tube 204, to be discharged into the second coolant chamber 32 on the other-end side Y2 in the axial direction Y, and the coolant is discharged from the second coolant chamber 32 through the discharge port 202 to outside of the rotary electric machine 1. Thereafter, the coolant is deprived of heat by the heat exchanger and is ejected by the outside pump, to be introduced through the introduction port 201 of the rotary electric machine 1 again. Thus, heat generated in the rotary electric machine 1 can be transferred via the coolant to outside, to be dissipated, whereby operation can be performed at a lower temperature than the temperature limit of the rotary electric machine 1. As a result, larger output can be produced and a continuous energization time can be prolonged.

Further, the cooling tube 204 made of a nonconductive material keeps insulation from the winding 101. In addition, eddy current can be prevented from flowing due to a leakage magnetic flux when the winding 101 is energized, and thus heat generation can be suppressed. Further, since unnecessary loss can be prevented, a high-efficiency rotary electric machine can be provided. In addition, the cooling tube 204 enables the coolant to flow just near the winding 101 in the slot 13 and thus is suitable for cooling the winding 101. Further, since the cooling tube 204 is also adjacent just near the yoke portion 12, heat generated due to iron loss occurring at the tooth portion 13 or near the connection portion between the tooth portion 11 and the yoke portion 12 can be cooled.

Further, the cooling tube 204 is formed to have the large-width portion 41 on the one-end side Y1 in the axial direction Y which is the coolant-introduction side, and have the narrow-width portion 42 on the other-end side Y2 in the axial direction Y which is the coolant-discharge side. Thus, the coolant can flow smoothly in the cooling tube 204 and pressure loss can be reduced.

Since the large-width portion 41 of the cooling tube 204, the wire-connection portion 203 of the winding 101 and the terminal portion 104 for supplying power to the rotary electric machine 1 are located or the introduction port 201 side, the wire-connection portion 103 and the terminal portion 104 which are heat-generating parts of the winding 103 and can generate heat due to contact resistance and resistance based on joining such as welding, can be actively cooled, whereby the temperature gradient can be reduced and uniformed in the rotary electric machine 1. Thus, it becomes possible to keep a lower-temperature state than the temperature limit of the rotary electric machine 1, whereby continuous energization can be performed. Further, if current input can be increased owing to the temperature allowance, output can also be increased.

For the winding 101 of embodiment 1, one-pole pitch (45°) in distributed winding is adopted. However, the same cooling effects as in embodiment 1 are provided even in a case of adopting a shorter or longer pitch than one-pole pitch. The numbers of the tooth portions 11 and the slots 13 of embodiment 1 are 48. However, the same effects as in embodiment 1 are provided as long as the numbers are applicable to the configuration of the windings 101 for three phases or multiple phases. The winding 101 shown in FIG. 1 and FIG. 2 in the present embodiment is wound using rectangular wires, as an example. However, the same cooling effects as in embodiment 1 are provided even with round wires.

In embodiment 1, the rotary electric machine 1 has been described. However, the same effects as in embodiment 1 are provided even in a case of an electric generator or a motor. On the rotor 3 side, a permanent-magnet motor using permanent magnets may be adopted or a rotary electric machine of a field-winding type which produces magnetomotive force through energization by a brush may be adopted, whereby the same effects as in embodiment 1 are provided. In addition, the same effects as in embodiment 1 are provided even in a case of an induction machine composed of a rotor and a conductive member such as aluminum or copper. Such matters also apply to the other embodiments and therefore description thereof is omitted as appropriate.

The stator of embodiment 1 configured as described above includes: a stator core including a yoke portion formed in an annular shape and a plurality of tooth portions formed on an inner side in a radial direction of the yoke portion so as to be arranged at predetermined intervals in a circumferential direction and protrude toward the inner side in the radial direction; and a winding arranged in slots formed between the tooth portions. The stator includes cooling tubes made of a nonconductive material, each cooling tube extending in an axial direction of the stator and serving as a flow path for a coolant. The cooling tube has a constant outer shape along the axial direction and has a thickness that changes along the axial direction.

Further, the rotary electric machine includes: the above stator; and a rotor provided so as to be opposed to the stator with a gap therebetween.

Thus, the small-thickness part of the cooling tube is located at a heat-generating part of the stator, whereby the high-temperature part can be actively cooled and the stator and the rotary electric machine which could have a temperature gradient in the axial direction can be thermally uniformed.

The cooling tube is provided on an outer side in the radial direction relative to the winding in each slot, and in each slot, the winding and the cooling tube are arranged in a straight shape in the radial direction.

Thus, the cooling tube can directly cool heat of the winding and directly cool heat of the yoke portion.

The thickness of the cooling tube increases from a one-end side toward an other-end side in the axial direction.

Thus, pressure loss in the cooling tube can be reduced, and the heat-generating part and the cooling part can be thermally uniformed.

A wire-connection portion of the winding is formed on an axial-direction side where the thickness of the cooling tube is small.

Thus, the heat-generating part and the cooling part can be thermally uniformed.

An introduction port for the coolant is formed on an axial-direction side where the thickness of the cooling tube is small.

Thus, pressure loss in the cooling tube can be reduced.

On a one-end side and an other-end side in the axial direction of a plurality of the cooling tubes, a first coolant chamber and a second coolant chamber are respectively formed so as to communicate with the plurality of cooling tubes along the circumferential direction and serve as flow paths for the coolant.

Thus, the cooling tubes can easily communicate with the first coolant chamber and the second coolant chamber.

The first coolant chamber and the second coolant chamber are formed so as to communicate over entire circumferences in the circumferential direction on the one-end side and the other-end side in the axial direction of the plurality of cooling tubes.

Thus, the cooling tubes can assuredly communicate with the first coolant chamber and the second coolant chamber.

Embodiment 2

Figure 6:
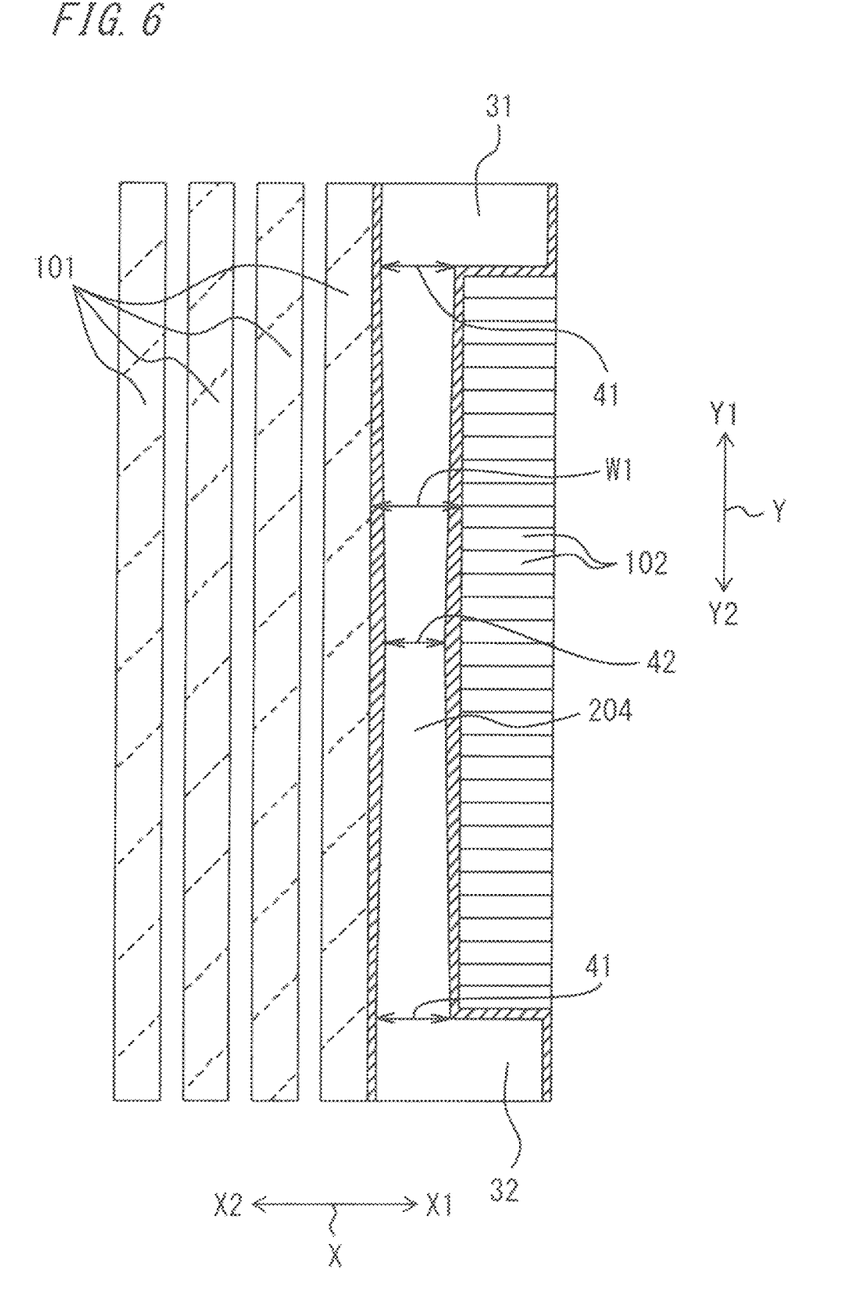
FIG. 6 is a sectional view along the axial direction, showing the structure of a stator according to embodiment 2 and showing a radial-direction part thereof.

FIG. 6 is a sectional view along the axial direction, showing the structure of a stator according to embodiment 2 and showing a radial-direction part thereof. In the drawing, the same parts as in the above embodiment 1 are denoted by the same reference characters and description thereof is omitted. In the cooling tube 204, the large-width portions 41 having a small thickness are formed on both of the one-end side Y1 and the other-end side Y2 in the axial direction Y, and the narrow-width portion 42 having a large thickness is formed at the center part in the axial direction Y.

In the stator 2 of embodiment 2 configured as described above, in a case where the cooling tube 204 is manufactured using resin which is a nonconductive material, the cooling tube 204 can be formed by two divisional molds on the one-end side Y1 and the other-end side Y2 divided at the center in the axial direction Y. Thus, the length in the axial direction Y of the molds is reduced. Also, the thicknesses on both of the one-end side Y1 and the other-end side Y2 in the axial direction Y due to the draft of the molds can be made small, whereby heat generated by the winding 101 can be efficiently removed.

Generally, insulation paper is provided to the winding 101. With the insulation paper, insulation performance might be reduced at the center part in the axial direction Y in accordance with the distance from the one-end side Y3 or the other-end side Y2 in the axial direction Y with respect to the stator 2. However, in embodiment 2, since the thickness of the nonconductive material of the cooling tube 204 is great at the center part in the axial direction Y, a long insulation distance can be ensured at the center part in the axial direction Y. Further, when the rotary electric machine 1 is in a high-temperature state, the length thereof increases by an amount corresponding to the linear expansion coefficient in the axial direction Y. At this time, the cooling tube 204 is pulled in the axial direction Y, so that stress occurs at the center part in the axial direction Y of the cooling tube 204. However, in embodiment 2, since the thickness of the nonconductive material of the cooling tube 204 is greater at the center part in the axial direction Y, thermal stress is reduced.

In the stator of embodiment 2 configured as described above, the same effects as in the above embodiment 1 are provided.

Also, the thickness of the cooling tube is greater at a center part in the axial direction of the stator than on both end sides in the axial direction. Thus, heat generated by the winding is removed, the insulation distance is ensured, and thermal stress is reduced.

Embodiment 3

Figure 7:
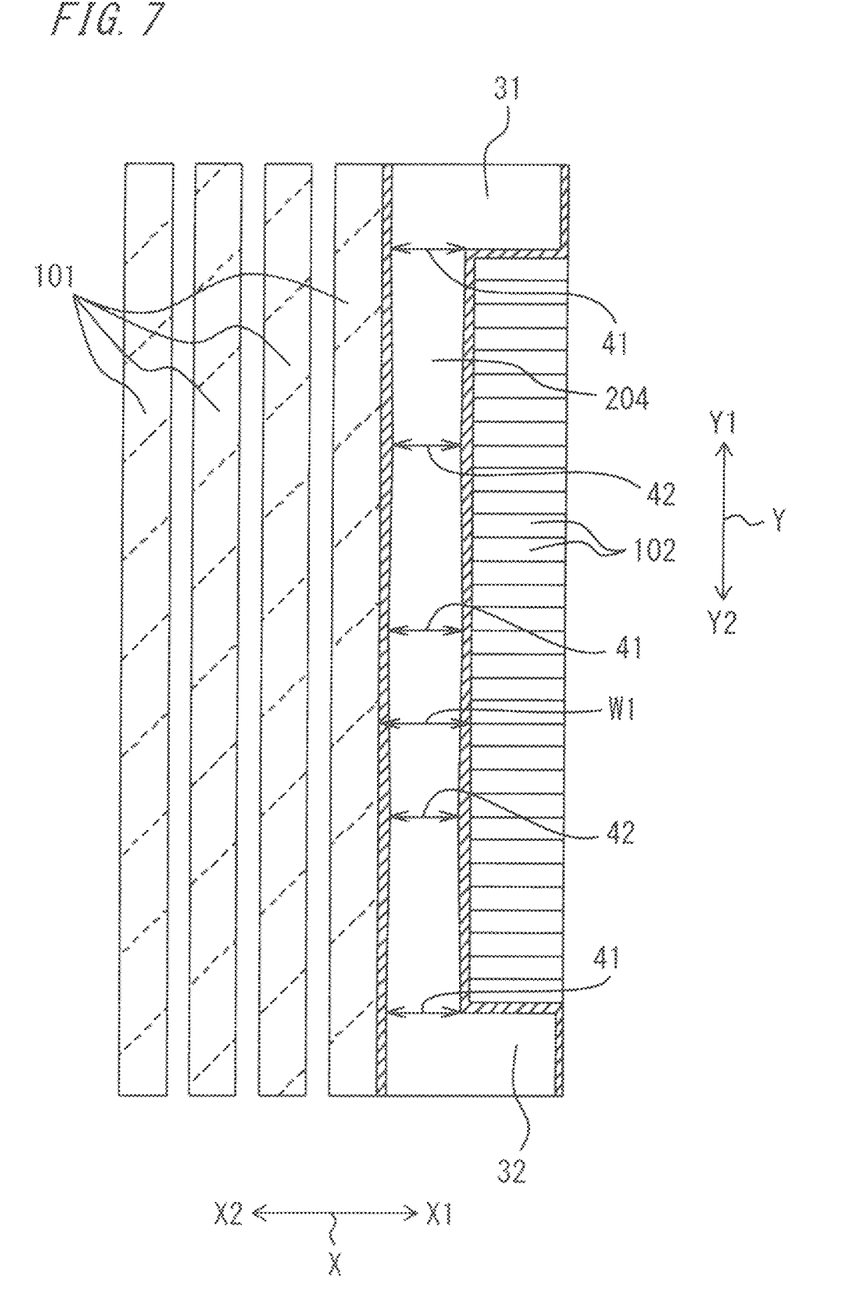
FIG. 7 is a sectional view along the axial direction, showing the structure of a stator according to embodiment 3 and showing a radial-direction part thereof.

FIG. 2 is a sectional view along the axial direction, showing the structure of a stator according to embodiment 3 and showing a radial-direction part thereof. In the drawing, the same parts as in the above embodiments are denoted by the same reference characters and description thereof is omitted. In the cooling tube 204, the large-width portions 41 having a small thickness are formed at the one-end side Y1 in the axial direction Y, the other-end side Y2 in the axial direction Y, and the center part in the axial direction Y, and the narrow-width portions 42 having a large thickness are formed between the one-end side Y1 and the center part and between the other-end side Y2 and the center part in the axial direction Y.

In the stator 2 of embodiment 3 configured as described above, in a case where the cooling tube 204 is manufactured using resin which is a nonconductive material, in the axial direction Y, the cooling tube 204 can be formed by three divisional tubular molds on the outer side X1, on the inner side X2, and between the outer side X1 and the inner side X2 in the radial direction X. Since the cooling tubes 204 are configured as described above, when heat-generating parts of the tooth portions 11 are different in the axial direction Y, the large-width portions 41 of the cooling tubes 204 can be formed at respective appropriate parts, whereby cooling efficiency can be improved and a thermally uniformed state can be achieved. Thus, it is possible to keep a lower-temperature state than the temperature limit of the rotary electric machine 3 in a general drive method, whereby continuous energization can be performed.

Since some allowance is provided to the thermal withstanding property, if current input can be increased, output can be increased. Since molding can be performed as described above, the draft of the molds can be reduced, and the thickness is reduced at the one-end side Y1 in the axial direction Y, the other-end side Y2 in the axial direction Y, and the center part in the axial direction Y. Thus, the thickness of the cooling tube 204 is small overall and the cooling performance of the winding 101 is improved. Further, heat due to iron loss occurring in the yoke portion 32 can be cooled as well.

In the stator of embodiment 3 configured as described above, the same effects as in the above embodiments are provided.

Also, the stator includes: a core including a yoke portion formed in an annular shape and a plurality of tooth portions formed on an inner side in a radial direction of the yoke portion so as to be arranged at predetermined intervals in a circumferential direction and protrude toward the inner side in the radial direction; and a winding arranged in slots formed between the tooth portions. The stator includes cooling tubes made of a nonconductive material, each cooling tube extending in an axial direction and serving as a flow path for a coolant. The cooling tube has a constant outer shape along the axial direction and has a thickness that changes along the axial direction.

Thus, cooling efficiency of the stator is improved, and continuous energization or output increase can be achieved.

Embodiment 4

Figure 8:
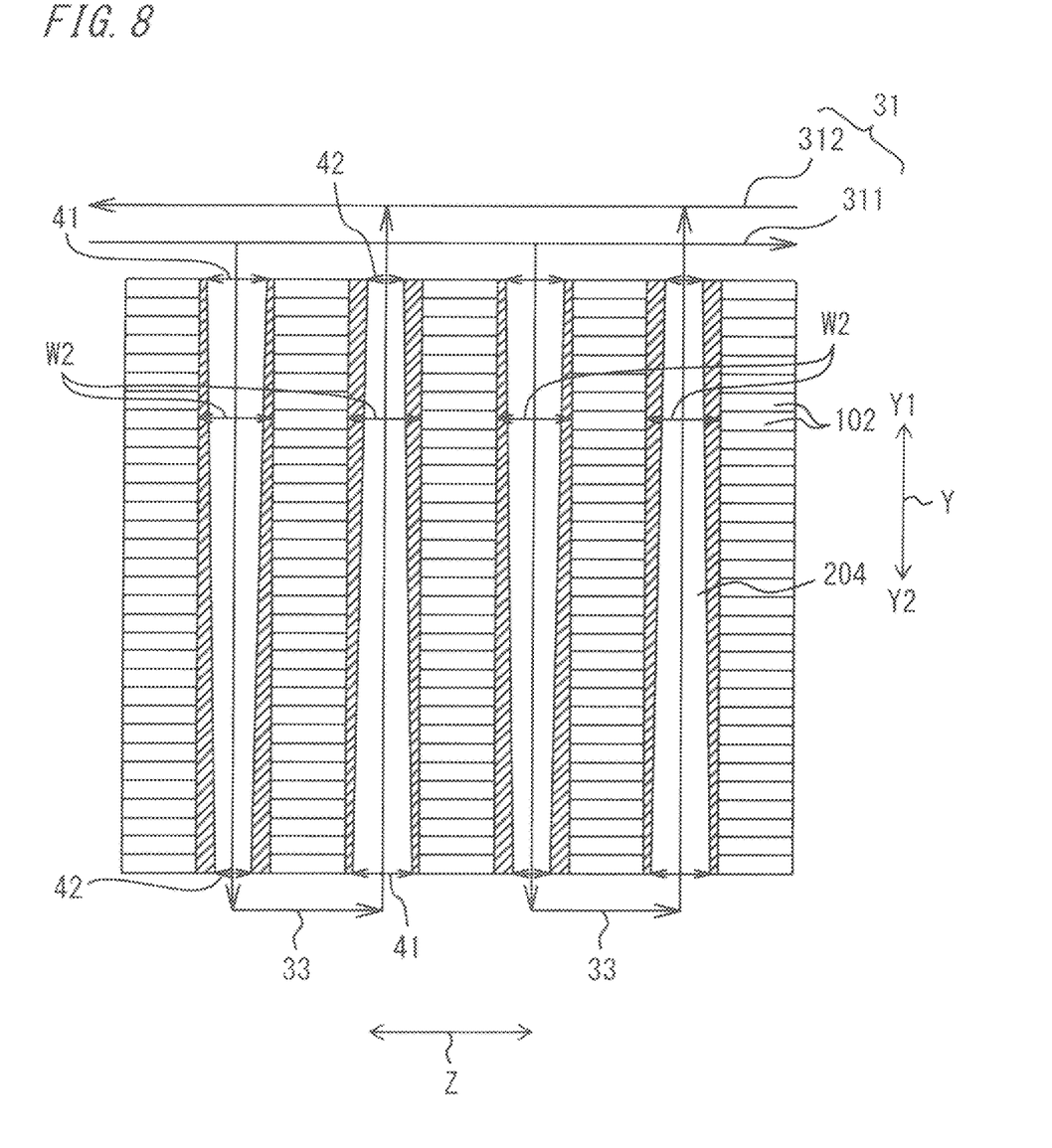
FIG. 8 is a schematic sectional view along the axial direction, snowing the structure of a stator according to embodiment 4 when a circumferential-direction part is seen from the inner-circumferential side.
Figure 9:
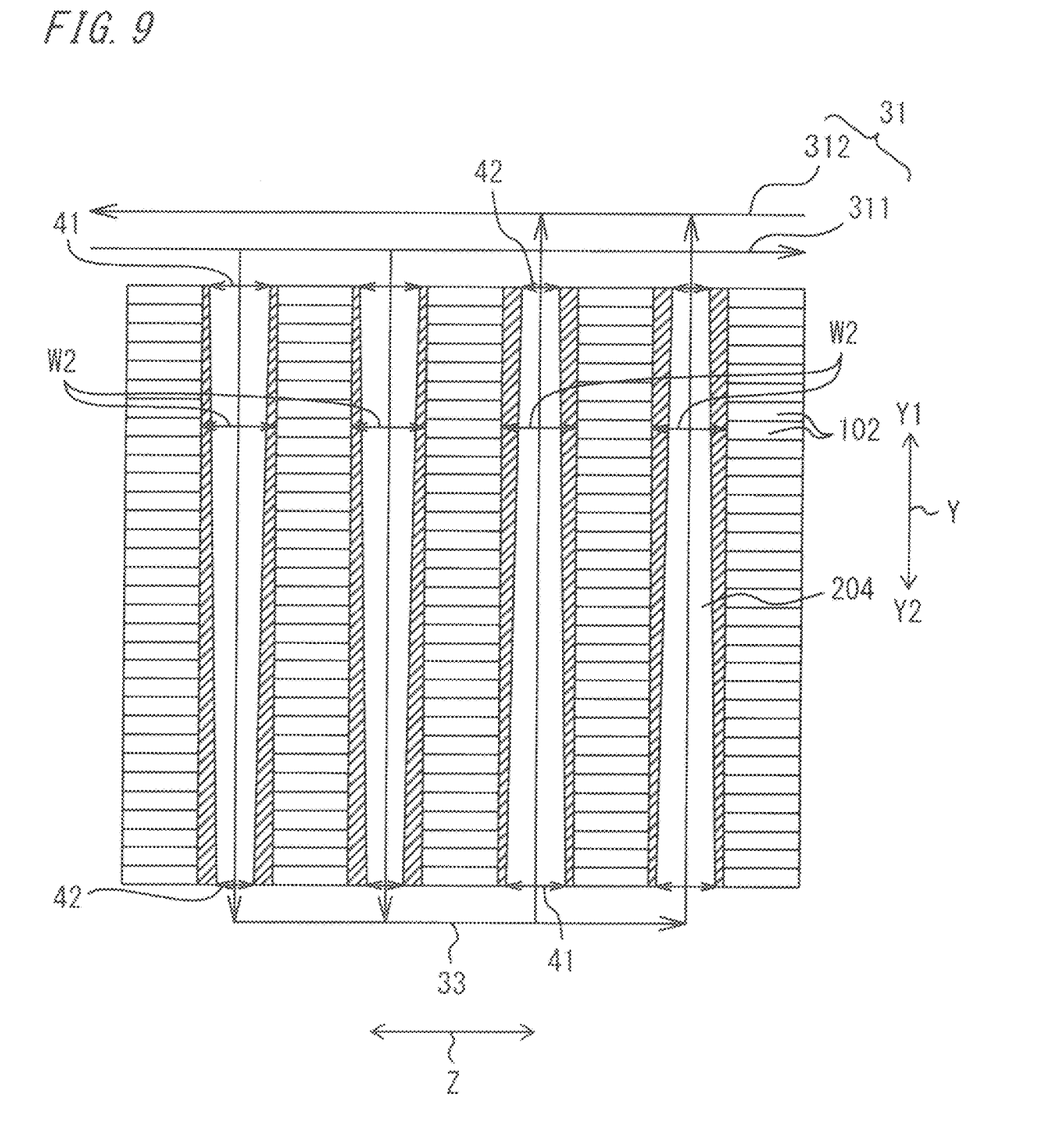
FIG. 9 is a schematic sectional view along the axial direction, showing the structure of another stator according to embodiment 4 when a circumferential-direction part is seen from the inner-circumferential side.
Figure 10:
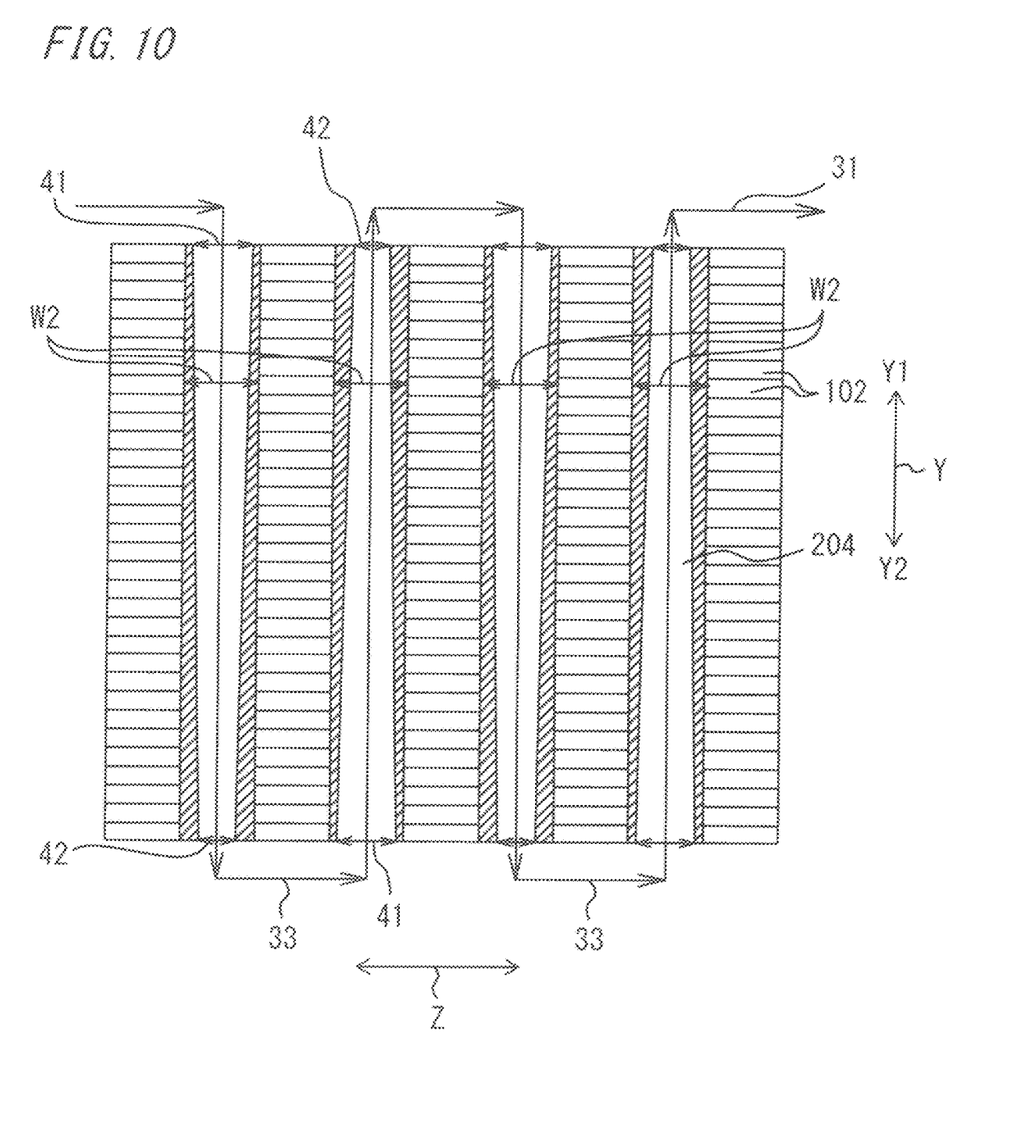
FIG. 10 is a schematic sectional view along the axial direction, showing the structure of another stator according to embodiment 4 when a circumferential-direction part is seen from the inner-circumferential side.

FIG. 8, FIG. 9, and FIG. 10 are sectional views along the axial direction, showing the structures of stators according to embodiment 4 when a circumferential-direction part is seen from the inner-circumferential side. The above embodiment 1 has shown the example in which the thicknesses of all the cooling tubes 204 increase from the one-end side Y1 toward the other-end side Y2 in the axial direction Y. In embodiment 4, a case of having the cooling tube 204 of which the thickness increases from the one-end side Y2 toward the other-end side Y2 in the axial direction Y and the cooling tube 204 of which the thickness increases from the other-end side Y2 toward the one-end side Y1 in the axial direction Y, will be described.

FIG. 8 shows a case where the cooling tube 204 of which the thickness increases from the one-end side Y1 toward the other-end side Y2 in the axial direction Y and the cooling tube 204 of which the thickness increases from the other-end side Y2 toward the one-end side Y1 in the axial direction Y are formed alternately along the circumferential direction Z. In this case, the first coolant chamber 31 on the one-end side Y1 in the axial direction Y is formed with a duplex structure in which one side is formed as an introduction side 311 for the coolant and the other side is formed as a discharge side 312 for the coolant. Each cooling tube 204 communicates with either the introduction side 311 or the discharge side 312 of the first coolant chamber 31 having the duplex structure.

Here, the cooling tube 204 having the large-width portion 41 on the one-end side Y1 in the axial direction Y communicates with the introduction side 311, and the cooling tube 204 having the narrow-width portion 42 on the one-end side Y1 in the axial direction Y communicates with the discharge side 312. Or the other-end side Y2 in the axial direction Y, a second coolant chamber 33 is formed so as to communicate, in the circumferential direction Z, with the cooling tube 204 having the narrow-width portion 42 on the other-end side Y2 in the axial direction Y and the cooling tube 204 having the large-width portion 41 on the other-end side Y2 in the axial direction Y.

With the structure as shown in FIG. 8, the introduction side 311 and the discharge side 312 can be formed in the first coolant chamber 31. Thus, the cooling tubes 204 can be easily arranged and ease of layout in the rotary electric machine 1 can be improved.

FIG. 9 shows a case where the cooling tube 204 of which the thickness increases from the one-end side Y1 toward the other-end side Y2 in the axial direction Y and the cooling tube 204 of which the thickness increases from the other-end side Y2 toward the one-end side Y1 in the axial direction Y are formed two-by-two alternately along the circumferential direction Z. In this case, the first coolant chamber 31 on the one-end side Y1 in the axial direction Y is formed with a duplex structure in which one side is formed as an introduction side 311 for the coolant and the other side is formed as a discharge side 312 for the coolant. Each cooling tube 204 communicates with either the introduction side 311 or the discharge side 312 of the first coolant chamber 31 having the duplex structure.

Here, the cooling tube 204 having the large-width portion 41 on the one-end side Y1 in the axial direction Y communicates with the introduction side 311, and the cooling tube 204 having the narrow-width portion 42 on the one-end side Y1 in the axial direction 7 communicates with the discharge side 312. On the other-end side Y2 in the axial direction Y, a second coolant chamber 33 is formed so as to communicate with the cooling tubes 204 at four consecutive parts in the circumferential direction Z, i.e., two parts where the cooling tubes 204 having the narrow-width portions 42 on the other-end side Y2 in the axial direction Y are consecutively arranged in the circumferential direction Z and two parts where the cooling tubes 204 having the large-width portions 41 on the other-end side Y2 in the axial direction Y axe consecutively arranged in the circumferential direction Z.

With the structure as shown in FIG. 9, the second coolant chamber 33 need not be formed over the entire circumference in the circumferential direction Z, and thus the structure can be simplified.

FIG. 10 shows a case where the cooling tube 204 of which the thickness increases from the one-end side Y1 toward the other-end side Y2 in the axial direction Y and the cooling tube 204 of which the thickness increases from the other-end side Y2 toward the one-end side Y1 in the axial direction Y are formed alternately along the circumferential direction Z. In this case, the first coolant chamber 31 on the one-end side Y1 in the axial direction Y and the second coolant chamber 32 on the other-end side Y2 in the axial direction Y are formed in a staggered manner in the circumferential direction Z.

With the structure as shown in FIG. 10, the first coolant chamber 31 and the second coolant chamber 32 need not be formed over the entire circumferences in the circumferential direction Z, and thus the structure can be simplified.

Embodiment 4 has shown the case where the thickness of the cooling tube increases from the one-end side toward the other-end side in the axial direction as shown in the above embodiment 1. However, without limitation thereto, the structure of the cooling tube in embodiment 2 or 3 may be used, whereby the same effects can be provided.

In the stator of embodiment 4 configured as described above, the same effects as in the above embodiments are provided.

Also, the first coolant chamber is formed with a duplex structure in which one side is formed as an introduction side for the coolant and another side is formed as a discharge side for the coolant, and each cooling tube communicates with either side of the first coolant chamber having the duplex structure.

Thus, the introduction side and the discharge side for the coolant can be formed in the first coolant chamber, whereby the cooling tubes can be easily arranged and ease of layout in the rotary electric machine is improved.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 rotary electric machine
102 winding
102 core
103 wire-connection portion
104 terminal portion
11 tooth portion
12 yoke portion
13 slot
2 stator
201 introduction port
202 discharge port
204 cooling tube
3 rotor
31 first coolant chamber
32 second coolant chamber
311 introduction side
312 discharge side
41 large-width portion
42 narrow-width portion
X radial direction
X1 outer side
X2 inner side
Y axial direction
Y1 one-end side
Y2 other-end side Z circumferential direction
W1 outer width
W2 outer width

The invention claimed is:

1. A stator comprising:
a stator core including a yoke portion formed in an annular shape and a plurality of tooth portions formed on an inner side in a radial direction of the yoke portion so as to be arranged at predetermined intervals in a circumferential direction and protrude toward the inner side in the radial direction; and
a winding arranged in slots formed between the tooth portions, wherein
the stator includes cooling tubes made of a nonconductive material, each of the cooling tubes extending in an axial direction of the stator and serving as a flow path for a coolant,
the cooling tubes are disposed nearer to the yoke portion than are the windings,
each of the cooling tubes has a constant outer shape along the axial direction and has a thickness that changes along the axial direction,
the stator includes an introduction-side coolant chamber provided on an introduction side for the coolant and a discharge-side coolant chamber provided on a discharge side for the coolant,
the thickness of each of the cooling tubes increases toward one side in the axial direction,
a large-width portion of a plurality of the cooling tubes communicates with the introduction-side coolant chamber,
a narrow-width portion of a plurality of the cooling tubes communicates with the discharge-side coolant chamber,
the introduction-side coolant chamber and the discharge-side coolant chamber are formed by a first coolant chamber having a duplex structure on a one-end side in the axial direction,
a second coolant chamber communicating with the cooling tubes along the circumferential direction is formed on an other-end side in the axial direction,
the cooling tubes whose the large-width portions are formed on the one-end side in the axial direction communicate with the introduction-side coolant chamber, and
the cooling tubes whose the narrow-width portions are formed on the one-end side in the axial direction communicate with the discharge-side coolant chamber.

2. The stator according to claim 1, wherein
each of the cooling tubes is provided on an outer side in the radial direction relative to the winding in a respective slot, and
in the respective slot, the winding and the cooling tube are arranged in a straight shape in the radial direction.

3. A rotary electric machine comprising:
the stator according to claim 1; and
a rotor provided so as to be opposed to the stator with a gap therebetween.

4. A stator comprising:
a stator core including a yoke portion formed in an annular shape and a plurality of tooth portions formed on an inner side in a radial direction of the yoke portion so as to be arranged at predetermined intervals in a circumferential direction and protrude toward the inner side in the radial direction; and
a winding arranged in slots formed between the tooth portions, wherein
the stator includes cooling tubes made of a nonconductive material,
each of the cooling tubes extending in an axial direction of the stator and serving as a flow path for a coolant,
each of the cooling tubes has a constant outer shape along the axial direction and has a thickness that changes along the axial direction,
ones of the cooling tubes whose thickness increases from a one-end side in the axial direction toward an other-end side in the axial direction and ones of the cooling tubes whose thickness increases from the other-end side in the axial direction toward the one-end side in the axial direction are formed alternately along the circumferential direction, and
a first coolant chamber formed on the one-end side in the axial direction and communicating with the cooling tubes and a second coolant chamber formed on the other-end side in the axial direction and communicating with the cooling tubes are formed in a staggered manner.

5. The stator according to claim 4, wherein
each of the cooling tubes is provided on an outer side in the radial direction relative to the winding in a respective slot, and
in the respective slot, the winding and the cooling tube are arranged in a straight shape in the radial direction.

6. A rotary electric machine comprising:
the stator according to claim 4; and
a rotor provided so as to be opposed to the stator with a gap therebetween.

* * * * *